US012583404B2

(12) United States Patent
Krishnamurthy et al.

(10) Patent No.: US 12,583,404 B2
(45) Date of Patent: Mar. 24, 2026

(54) OPERATOR-CUSTOMIZED VEHICLE CONTROL

(71) Applicant: Ford Global Technologies, LLC, Dearborn, MI (US)

(72) Inventors: Karthik Krishnamurthy, Farmington Hills, MI (US); Bhagyashri Satyabodha Katti, Novi, MI (US); Walter Joseph Talamonti, Canton, MI (US); Johannes Geir Kristinsson, Ann Arbor, MI (US); Kwaku O. Prakah-Asante, Commerce Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 350 days.

(21) Appl. No.: 18/177,840

(22) Filed: Mar. 3, 2023

(65) Prior Publication Data

US 2024/0294129 A1    Sep. 5, 2024

(51) Int. Cl.
| | |
|---|---|
| *B60R 16/037* | (2006.01) |
| *B60K 35/00* | (2024.01) |
| *B60K 35/10* | (2024.01) |
| *B60K 35/65* | (2024.01) |

(52) U.S. Cl.
CPC ............ *B60R 16/037* (2013.01); *B60K 35/10* (2024.01); *B60K 35/65* (2024.01)

(58) Field of Classification Search
CPC . B60R 16/037; B60R 16/023; B60R 16/0373; B60K 35/00; B60K 35/65; B60K 35/10
See application file for complete search history.

(56) References Cited

U.S. PATENT DOCUMENTS

| | | | | |
|---|---|---|---|---|
| 9,229,905 | B1* | 1/2016 | Penilla | .................. G06Q 20/18 |
| 9,942,356 | B1 | 4/2018 | Gibson et al. | |
| 9,963,012 | B2* | 5/2018 | Stevanovic | ........ B60H 1/00971 |
| 10,147,325 | B1* | 12/2018 | Copeland | ............. G06Q 20/145 |
| 10,334,073 | B2 | 6/2019 | Gibson et al. | |
| 11,270,699 | B2 | 3/2022 | Penilla et al. | |
| 2014/0309869 | A1* | 10/2014 | Ricci | ...................... G06Q 10/00 |
| | | | | 701/36 |
| 2017/0247000 | A1* | 8/2017 | Ricci | ..................... B60R 16/037 |

(Continued)

FOREIGN PATENT DOCUMENTS

| | | | |
|---|---|---|---|
| WO | 2021195335 A1 | 9/2021 | |

OTHER PUBLICATIONS

Xishun Liao, Shashank Mehrotra, Samson Ho, Yuki Gorospe, Xingwei Wu, Teruhisa Misu, "Driver Profile Modeling Based on Driving Style, Personality Traits, and Mood States," Jun. 2022, The 25th IEEE International Conference on Intelligent Transportation Systems at Macau, China, pp. 1-8 (Year: 2022).*

*Primary Examiner* — Peter D Nolan
*Assistant Examiner* — Demetra R Smith-Stewart
(74) *Attorney, Agent, or Firm* — Christopher Storms; Brooks Kushman P.C.

(57) ABSTRACT

A computer includes a processor and a memory, and the memory stores instructions executable by the processor to receive operator input from an operator in response to an operator assessment questionnaire, identify a preference grouping for the operator based on the operator input, and actuate at least one vehicle component based on the preference grouping.

19 Claims, 2 Drawing Sheets

(56) References Cited

U.S. PATENT DOCUMENTS

| | | | |
|---|---|---|---|
| 2019/0016343 A1* | 1/2019 | Allen | G06Q 50/40 |
| 2019/0082032 A1* | 3/2019 | Gibson | H04L 67/142 |
| 2022/0224963 A1* | 7/2022 | Herz | G06Q 50/40 |
| 2022/0270177 A1* | 8/2022 | Chintakindi | H04W 4/029 |

* cited by examiner

OPERATOR-CUSTOMIZED VEHICLE CONTROL

BACKGROUND

Many modern vehicles can include a voice-recognition or speech-to-text system. Such a system includes a microphone. The system converts spoken words detected by the microphone into text or another form to which a command can be matched. Recognized commands can include adjusting climate controls, selecting media to play, etc.

DETAILED DESCRIPTION

Figure 1:
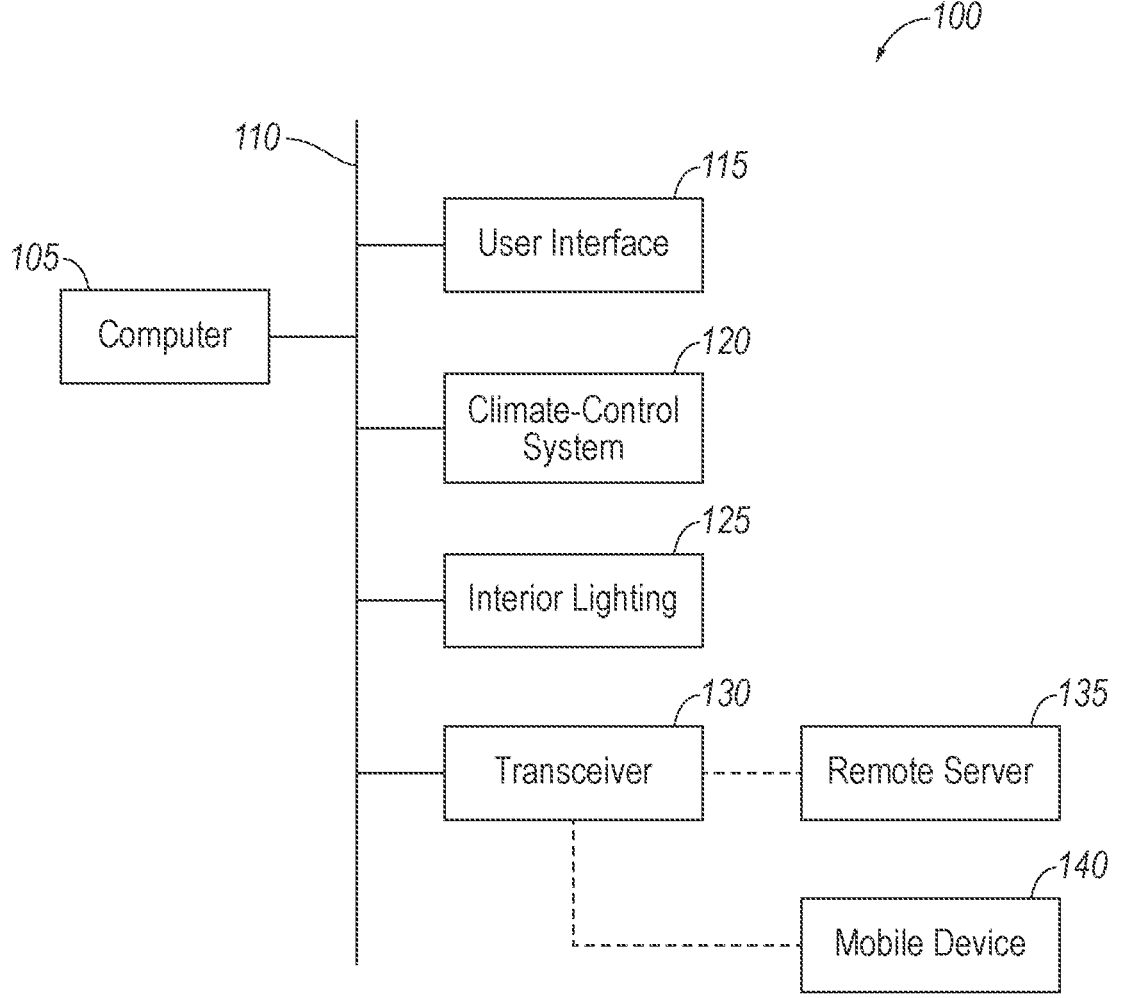
FIG. 1 is a block diagram of an example vehicle.

This disclosure describes techniques for customizing actuation of vehicle components for a particular operator of the vehicle based on an assessment of the operator. A computer on board the vehicle may be programmed to receive operator input in response to an operator assessment questionnaire, identify a preference grouping for the operator based on the operator input, and actuate at least one vehicle component based on the preference grouping. A preference grouping is a collection of multiple types of operators, which may be considered to have similar preferences with respect to actuating the vehicle. Examples of actuating vehicle components based on the preference grouping include changing a density of content on a display screen, a frequency of outputting audible statements, a climate-control setting, a frequency of executing a vehicle feature received from a remote server, an interior lighting setting, etc. Thus, a wide variety of vehicle components may be controlled according to the preference grouping without further interventions by the operator beyond the initial operator input.

A computer includes a processor and a memory, and the memory stores instructions executable by the processor to receive operator input from an operator in response to an operator assessment questionnaire, identify a preference grouping for the operator based on the operator input, and actuate at least one vehicle component based on the preference grouping.

In an example, the instructions may further include instructions to determine a personality type of the operator based on the operator input. In a further example, the instructions may further include instructions to identify the preference grouping based on the personality type. In a yet further example, the preference grouping may be an identified preference grouping, the instructions to identify the identified preference grouping may include instructions to execute a machine-learning program, and the machine-learning program may be trained to cluster personality types into preference groupings including the identified preference grouping.

In another further example, the operator input may include a plurality of answers to the operator assessment questionnaire, and the instructions to determine the personality type may include instructions to determine a plurality of scores along a respective plurality of dimensions of the personality type.

In an example, the instructions may further include instructions to identify the operator, and associate the preference grouping with the operator in a profile of the operator.

In an example, the instructions may further include instructions to select a collection of vehicle settings based on the preference grouping, and actuate the at least one vehicle component in accordance with the collection of the vehicle settings. In a further example, the instructions may further include instructions to receive an input from the operator, and adjust at least one of the vehicle settings in the collection based on the input. In a yet further example, the instructions may further include instructions to store the adjustment of the at least one of the vehicle settings in a profile of the operator. In a still yet further example, the instructions may further include instructions to, during a vehicle trip after a vehicle trip in which the adjustment occurred, actuate the at least one vehicle component in accordance with the adjustment of the at least one of the vehicle settings.

In another still yet further example, the instructions may further include instructions to store an adjustment time of day with the adjustment, and, during a vehicle trip after a vehicle trip in which the adjustment occurred, in response to a current time of day being within a same time window as the adjustment time of day, actuate the at least one vehicle component in accordance with the adjustment of the at least one of the vehicle settings.

In another yet further example, the input may be a command to the at least one vehicle component.

In another yet further example, a direction of the adjustment may be based on whether a characteristic of the input is above or below a threshold.

In another further example, the preference grouping may be an identified preference grouping, the collection of the vehicle settings may be a selected collection, the memory may store a plurality of preference groupings including the identified preference grouping and a plurality of collections of the vehicle settings including the selected collection, and the memory may store a mapping of the preference groupings to the collections.

In another further example, the vehicle settings may include a density of content on a display screen.

In another further example, the vehicle settings may include a frequency of outputting audible statements.

In another further example, the vehicle settings may include a climate-control setting.

In another further example, the vehicle settings may include a frequency of executing a vehicle feature received from a remote server.

In another further example, the vehicle settings may include an interior lighting setting.

A method includes receiving operator input from an operator in response to an operator assessment questionnaire, identifying a preference grouping for the operator based on the operator input, and actuating at least one vehicle component based on the preference grouping.

With reference to the Figures, wherein like numerals indicate like parts throughout the several views, a computer 105 includes a processor and a memory, and the memory stores instructions executable by the processor to receive operator input from an operator in response to an operator assessment questionnaire, identify a preference grouping for the operator based on the operator input, and actuate at least one vehicle component of a vehicle 100 based on the preference grouping.

With reference to FIG. 1, the vehicle 100 may be any passenger or commercial automobile such as a car, a truck, a sport utility vehicle, a crossover, a van, a minivan, a taxi, a bus, etc.

The computer 105 is a microprocessor-based computing device, e.g., a generic computing device including a processor and a memory, an electronic controller or the like, a field-programmable gate array (FPGA), an application-specific integrated circuit (ASIC), a combination of the foregoing, etc. Typically, a hardware description language such as VHDL (VHSIC (Very High Speed Integrated Circuit) Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. The computer 105 can thus include a processor, a memory, etc. The memory of the computer 105 can include media for storing instructions executable by the processor as well as for electronically storing data and/or databases, and/or the computer 105 can include structures such as the foregoing by which programming is provided. The computer 105 can be multiple computers coupled together.

The computer 105 may transmit and receive data through a communications network 110 such as a controller area network (CAN) bus, Ethernet, WiFi, Local Interconnect Network (LIN), onboard diagnostics connector (OBD-II), and/or by any other wired or wireless communications network. The computer 105 may be communicatively coupled to a user interface 115, a climate-control system 120, interior lighting 125, a transceiver 130, and other components via the communications network 110.

The user interface 115 presents information to and receives information from an occupant of the vehicle 100. The user interface 115 may be located, e.g., on an instrument panel in a passenger cabin of the vehicle 100, or wherever may be readily seen by the occupant. The user interface 115 may include dials, digital readouts, display screens, speakers, and so on for providing information to the occupant, e.g., human-machine interface (HMI) elements such as are known. The user interface 115 may include buttons, knobs, keypads, a microphone, and so on for receiving information from the occupant.

The user interface 115 may include a voice-activated system. The voice-activated system may accept commands spoken by the operator via a microphone. The voice-activated system may output messages to the operator in the form of audible statements, i.e., spoken sentences or short phrases. The audible statements may include confirmations that a command spoken by the operator is being performed, statements about the state of the vehicle 100 or its surroundings, media content such as news alerts, etc.

The climate-control system 120 provides heating and/or cooling to the passenger cabin of the vehicle 100. The climate-control system 120 may include a compressor, a condenser, a receiver-dryer, a thermal-expansion valve, an evaporator, blowers, fans, ducts, vents, vanes, temperature sensors, and other components that are known for heating or cooling vehicle interiors. The climate-control system 120 may operate to cool the passenger cabin by transporting a refrigerant through a heat cycle to absorb heat from the passenger cabin and expel the heat from the vehicle 100, as is known. The climate-control system 120 may include a heater core that operates as a radiator for an engine of the vehicle 100 by transferring some waste heat from the engine into the passenger cabin, as is known. The climate-control system 120 may include an electrically powered heater such as a resistive heater, positive-temperature-coefficient heater, electrically power heat pump, etc. The climate-control system 120 may include diffusers positioned to add scents to airflow through the climate-control system 120, e.g., in the ducts or at the vents.

The interior lighting 125 is positioned in a passenger cabin of the vehicle 100 and is positioned to illuminate portions of the passenger cabin. The interior lighting 125 may include a plurality of lamps and/or screens or other components of the user interface 115. The lamps of the interior lighting 125 may include any suitable type for illuminating the respective portion of the passenger cabin, including tungsten, halogen, high-intensity discharge (HID) such as xenon, light-emitting diode (LED), laser, etc. The interior lighting 125 may include overhead lamps in a ceiling of the passenger cabin. The interior lighting 125 may include lamps and/or screens on a dashboard of the passenger cabin for illuminating information displays or controls such as buttons, knobs, etc.

The transceiver 130 may be adapted to transmit signals wirelessly through any suitable wireless communication protocol, such as cellular, Bluetooth®, Bluetooth® Low Energy (BLE), ultra-wideband (UWB), WiFi, IEEE 802.11a/b/g/p, cellular-V2X (CV2X), Dedicated Short-Range Communications (DSRC), other RF (radio frequency) communications, etc. The transceiver 130 may be adapted to communicate with a remote server 135, that is, a server distinct and spaced from the vehicle 100. The remote server 135 may be located outside the vehicle 100. For example, the remote server 135 may be associated with another vehicle (e.g., V2V communications), an infrastructure component (e.g., V2I communications), an emergency responder, a mobile device 140 associated with the operator or owner of the vehicle 100, etc. The transceiver 130 may be one device or may include a separate transmitter and receiver.

The mobile device 140 is a portable computing device such as a mobile phone, e.g., a smartphone, or a tablet. The mobile device 140 is a computing device including a processor and a memory. The mobile device 140 is owned and carried by a person who may be the operator or owner of the vehicle 100.

The components of the vehicle 100 have vehicle settings. The vehicle settings are characteristics of the operation of the component. Values of the vehicle settings are adjustable by the operator. The operator may provide an input via the user interface 115 to change the value of one of the vehicle settings. The computer 105 may be programmed to, in response to receiving the input to change the value of the vehicle setting, instruct the respective component to change the value of the vehicle setting. The components having vehicle settings may include the user interface 115, climate-control system 120, the interior lighting 125, the computer 105, etc.

The vehicle settings of the user interface 115 may include a density of content on a display screen of the user interface 115, a font size of the display screen, a brightness of the display screen, a color scheme of the display screen or other portions of the user interface 115, an arrangement of displaying selectable commands to the operator, choice of the selectable commands to display, choice of media played under a given option, etc. The density of content may include a number of icons per unit area of the display screen, a number of selectable commands displayed simultaneously on the display screen, and/or other characteristics affecting a compactness of information displayed on the display screen. The color scheme is a set of colors assigned to different visual features displayed by the display screen, e.g., a color for the background, a color for windows, different colors for different types of text, etc. The arrangement of selectable commands displayed to the operator may include where in a menu structure commands are located, e.g., which commands are located in a "quick access" section at or near a top of the menu structure. The choice of media may be which audio file is played by the user interface when a given type of media is selected, e.g., a channel when satellite radio is selected, a radio station when terrestrial radio is selected, a mindfulness program when a mindfulness app is opened, etc.

The vehicle settings of the voice-activated system of the user interface 115 may include a frequency of outputting audible statements, tone of voice or formality of audible statements, etc. The frequency of outputting the audible statements is a number of times outputting the audible statements per unit time. The frequency of outputting the audible statements may be controlled by, e.g., turning on or off specific types of audible statements, or by changing the frequency of the specific types of audible statements. Examples of types of audible statements include vehicle-related notifications such as speed, tire pressure, battery life, etc.; environment-related notifications such as traffic updates; media content; confirmations of voice commands; solicitations of voice commands; etc. The types of audible statements may be independently adjusted. The tone of voice of the audible statements may be an emotional valence of the audible statements, e.g., friendly, sad, humorous, neutral, etc. The formality indicates how formal or casual the language of the audible statement is.

The vehicle settings of the climate-control system 120 include at least one climate-control setting, e.g., desired temperature, air conditioning on or off, volumetric flow rate of the airflow, open or closing of vents, additions of scents to the airflow, choice of scents, etc. The open or closing of particular vents can control a location of the airflow within the passenger cabin, e.g., to the footwell, out of the dashboard, to the front windshield, etc. The addition of scents to the airflow may be accomplished by opening or closing a diffuser located in the ducts. The diffuser may actuate to release a scent or a one of a plurality of scents.

The vehicle settings of the interior lighting 125 include at least one interior lighting setting, e.g., a brightness of the interior lighting 125, a color scheme or the interior lighting 125, status of particular lamps as on or off, a duration of the interior lighting 125 remaining on, etc. The color scheme is a set of colors used by different lamps of the interior lighting 125. The duration of the interior lighting 125 may be an amount of time after an event triggering the interior lighting 125 to turn on has ended, e.g., opening and closing a door of the vehicle 100.

The vehicle settings of the computer 105 may include a frequency of executing a vehicle feature received from the remote server 135. The vehicle feature may be a set of instructions for actuating one or more components of the vehicle 100. For example, the vehicle feature may be a software update to a vehicle feature of the vehicle 100 or a new vehicle feature not currently on the vehicle 100. The remote server 135 may be associated with a manufacturer or fleet owner of the vehicle 100.

The memory of the computer 105 may store a plurality of collections of the vehicle settings. A collection of the vehicle settings is a set of values for multiple vehicle settings. The computer 105 may be programmed to actuate the components of the vehicle 100 according to a selected collection of the collections of vehicle settings. In other words, the computer 105 adjusts the vehicle settings to match the values of the vehicle settings from the selected collection.

The computer 105 may be programmed to identify the operator. For example, the operator can use a keyfob or the like to start the vehicle 100, and the keyfob can have an RFID tag or the like uniquely specifying the operator from among other potential operators who regularly use the vehicle 100. The RFID signal can be associated with the operator in memory. For another example, the mobile device 140 of the occupant can pair with, e.g., the user interface 115 or transceiver 130 of the vehicle 100. The mobile device 140 can be associated with the operator in memory. For another example, the computer 105 can use image data from a camera having a field of view in a passenger cabin of the vehicle 100 including a face of the operator and can identify the occupant using image-recognition techniques as are known. For another example, the computer 105 can use sound data and can identify the occupant using voice-recognition techniques as are known. For another example, the operator can enter identifying information such as a username and password into the user interface 115.

The computer 105 may be programmed to load a profile of the identified operator. The memory of the computer 105 may store profiles of specific operators of the vehicle 100. Each profile stores a plurality of elements and associates those elements with a specific one of the operators. The elements may include a personality type of the operator, a preference grouping of the operator, a collection of the vehicle settings, and adjustments to the vehicle settings, which are described below. As described below, the computer 105 is programmed to actuate the components of the vehicle 100 in accordance with elements of the profile of the identified operator.

The computer 105 is programmed to output an operator assessment questionnaire to the operator and receive operator input from the operator in response to the operator assessment questionnaire. The computer 105 may output the operator assessment questionnaire and receive the operator input via the user interface 115 or via the transceiver 130 and the mobile device 140. The operator assessment questionnaire may include a plurality of questions, e.g., multiple-choice questions. The operator input may include a plurality of answers to the respective questions, e.g., selections of choices for the multiple-choice questions. The operator assessment questionnaire may be a standardized set of questions for assessing a specific personality typology, e.g., the Big Five personality test, the Myers-Briggs Type Indicator, etc.

The computer 105 is programmed to determine the personality type of the operator based on the operator input. The computer 105 may determine a plurality of scores along a respective plurality of dimensions of the personality type, and possibly also subdimensions of the respective dimensions. The personality typology may specify the dimensions of the personality type as well as steps for determining the scores. For example, the Big Five personality test includes five dimensions for openness, conscientiousness, extraversion, agreeableness, and neuroticism. Each dimension may further include subdimensions; e.g., the dimension of openness includes subdimensions for fantasy, aesthetic interest, emotional orientation, experimentation, intellectualism, and diversity-tolerance. The Myers-Briggs test includes four dimensions for extraversion (E) versus introversion (I), sensing (S) versus intuition (N), thinking (T) versus feeling (F), and judgment (J) versus perception (P). Each answer to one of the questions contributes to a score along one or more of the dimensions and/or subdimensions, according to the instructions for administering the operator assessment questionnaire for that personality typology. The determined personality type may include a set of scores for the dimensions of the personality type, e.g., {low openness, high conscientiousness, low extraversion, low agreeableness, and low neuroticism} for the Big Five or {E, N, F, J} for Myers-Briggs.

The computer 105 is programmed to identify a preference grouping for the operator based on the operator input, e.g., based on the personality type resulting from the operator input. The preference groups are clusters of multiple types of operators, which may be considered to have similar preferences with respect to actuating the vehicle. The memory of the computer 105 may store a plurality of the preference groupings, and the computer 105 identifies the preference grouping for the operator from the stored preference groupings. In other words, the computer 105 sorts the personality type into one of the preference groupings. The preference groupings may be clusters of the possible personality types. The computer 105 may identify the preference grouping for a personality type by determining similarity scores between the personality type of the operator and each of the preference groupings and selecting the preference grouping with the similarity score indicating the greatest similarity. The similarity score may be a distance between the personality type and the respective preference grouping, e.g., a centroid of the respective preference grouping, in a space defined by the dimensions of the personality typology. The distance may be Euclidean, Mahalanobis, etc.

For example, the computer 105 may execute a machine-learning program to identify the preference grouping for the operator. The machine-learning program may be trained to cluster personality types into the preference groupings. The training data may be a plurality of sets of answers responding to the operator assessment questionnaire by individuals who are likely to be operators of the vehicle 100. Each set of answers may be scored as described above, and then the scores may be represented as coordinates in n-dimensional space, n being the number of dimensions of the personality typology. The machine-learning program may be trained using any suitable clustering algorithm for the personality types, e.g., k-means clustering, mini-batch k-means, density-based spatial clustering of applications with noise (DB-SCAN), Gaussian mixture model, balance iterative reducing and clustering using hierarchies (BIRCH), affinity propagation clustering, mean-shift clustering, ordering points to identify the clustering structure (OPTICS), agglomerative hierarchy clustering, divisive hierarchical clustering, spectral clustering, etc. The clustering algorithm may be one for which a final number of clusters is unspecified before executing the clustering algorithm to create the machine-learning program (though an initial estimate of the number of clusters may be a parameter of the clustering algorithm), e.g., affinity propagation, BIRCH, DBSCAN, mean shift, or OPTICS.

The computer 105 may be programmed to select one of the collections of the vehicle settings based on the identified preference grouping. The memory of the computer 105 may store a mapping of the preference groupings to the collections. The mapping specifies one of the collections for each of the preference groupings. More than one of the preference groupings may be mapped to the same collection of the vehicle settings. The mapping may be stored as a lookup table including the preference groupings paired with the collections of the vehicle settings.

The values of the vehicle settings in the different collections and the mapping may be chosen to match the vehicle settings with likely preferences of the operator as indicated by the preference grouping. For example, a preference grouping with a higher score along the dimension of openness may be mapped to a collection of vehicle settings having a higher density of content on the display screen. For another example, a preference grouping with a higher score of openness or extraversion may be mapped to a collection of vehicle settings having a higher frequency of outputting audible statements, a friendlier tone of voice, or less formal audible statements. For another example, a preference grouping with a higher score along the dimension of openness may be mapped to a collection of vehicle settings having a higher frequency of executing a vehicle feature received from the remote server 135. For another example, a preference grouping may be mapped to a collection of vehicle settings having a choice of media content of a mindfulness program specific to that preference grouping that will be played when a mindfulness app is opened. For another example, a preference grouping with a higher score of conscientiousness may be mapped to a collection of vehicle settings having a more subdued color scheme for the interior lighting.

The computer 105 may be programmed to receive an input from the operator and adjust at least one of the vehicle settings in the selected collection based on the input, in addition to possibly adjusting the value of the vehicle setting for the current operation of the respective vehicle component. The computer 105 may receive the input via the user interface 115. For example, the input may be a command to one of the vehicle components, e.g., increasing the brightness of the display screen of the user interface 115 or decreasing a desired temperature for the climate-control system 120. If so, the computer 105 adjusts the value of the vehicle setting for the current operation of the vehicle component. For another example, the input may be feedback from the operator, which the computer 105 may solicit by periodically outputting a question asking for the feedback. The feedback may be, e.g., a ranking on an ordinal scale indicating a level of satisfaction with the one or more of the vehicle settings, e.g., −5 to 5.

Upon receiving the input, the computer 105 may adjust the respective vehicle setting of the vehicle component in the collection of the vehicle settings. The computer 105 may adjust the vehicle setting based on a number of times receiving the same input, e.g., upon receiving the input three times from the same operator, possibly over multiple trips of the vehicle 100. The computer 105 may determine the adjustment to the vehicle setting based on the input. For example, the computer 105 may execute a learning function. The learning function may test whether a characteristic of the input is above or below a threshold. For example, the computer 105 may determine whether a function of the input, e.g., a function of a plurality of the inputs over time, is above or below a threshold. The direction of the adjustment may depend on whether the characteristic, e.g., the function of the input, is above or below the threshold. The function may be, e.g., a sum of a function of the feedback and a function of the frequency of commands to set the vehicle setting to a particular value, and the value of the vehicle setting in the collection may be adjusted to the operator-requested value:

$$\text{if } fb(Ex_{user}) + fq(Ex_{user}) > sig(Ex_{mod}), \text{ then } Ex_{mod} = Ex_{user}$$

in which $Ex_{user}$ is the operator-requested value of the vehicle setting, $Ex_{mod}$ is the value of the vehicle setting in the selected collection, fb is a function indicating feedback about the vehicle setting, fq is a function indicating the frequency of commands to set the vehicle setting to the operator-requested value, and sig is a function providing a threshold value for the comparison. The computer 105 may also compare whether a function of a baseline value for the vehicle setting is positive, and if so, the value of the vehicle setting in the collection may be adjusted to the baseline value:

$$\text{if } sig(Ex_{base}) > 0, \text{ then } Ex_{mod} = Ex_{base}$$

The computer 105 may also compare whether a function of baseline is negative or whether a function of the value of the setting from the selected collection is negative, and if so, the value of the vehicle setting in the collection may be adjusted to a new value:

$$\text{if } sig(Ex_{base}) < 0 \| fb(Ex_{mod}) + fq(Ex_{mod}) < 0, \text{ then } Ex_{mod} = Ex_{new}$$

in which $Ex_{new}$ is the new value of the vehicle setting. The new value $Ex_{new}$ may include a change in a value for an activated feature or a change of the feature between active and inactive. The new value may be an increase or decrease by a preset amount from the current value of the vehicle setting. The preset amount may be chosen to be a noticeable difference to the operator.

The computer 105 may store the adjustment to the vehicle setting, e.g., in the profile for the operator. For example, the computer 105 may store the collection of the vehicle settings with the adjusted vehicle setting as a new collection of vehicle settings. The computer 105 may store the adjustment of the vehicle setting by storing the new collection of the vehicle settings in the profile of the operator. For another example, the computer 105 may store the collection of the vehicle settings unchanged and separately store the adjustments as modifications to be applied to the vehicle settings from the collection. Along with the adjustment, the computer 105 may store a time of day at which the adjustment was made. The data stored in the profile of the operator may be stored permanently to use on later trips of the vehicle 100, i.e., a vehicle trip after the vehicle trip in which the adjustment occurred.

The computer 105 is programmed to actuate the vehicle components based on the preference grouping, e.g., in accordance with the collection of vehicle settings selected based on the preference grouping, as well as with any adjustments stored in the profile of the operator. The computer 105 may actuate the component to the value of the respective vehicle setting in the selected collection if the value is unadjusted and may actuate the component to the adjusted value otherwise. For example, the computer 105 may actuate the user interface 115 to change the density of content on the display screen to the value from the selected collection or to the adjusted value, or the computer 105 may actuate the climate-control system 120 to heat or cool the passenger cabin to the value of the desired temperature in the selected collection or to the adjusted value of the desired temperature.

The computer 105 may be programmed to, during a vehicle trip after a vehicle trip in which an adjustment of the vehicle settings occurred, actuate the vehicle component in accordance with the adjustment, i.e., actuate the component to the adjusted value. The computer 105 may be programmed to, during the vehicle trip after the vehicle trip in which the adjustment occurred, in response to a current time of day being within a same time window as the adjustment time of day, actuate the vehicle component in accordance with the adjustment. In other words, actuating the component in accordance with the adjustment may be dependent on a current time of day being close to the time of day at which the adjustment originally occurred. The time window may be chosen to cover a range of time during which vehicle trips with similar purposes occur, e.g., a morning commute time window, a later morning time window, a lunch-hour time window, an afternoon window, an evening commute window, an evening window, and a night window, or some other similar division.

Figure 2:
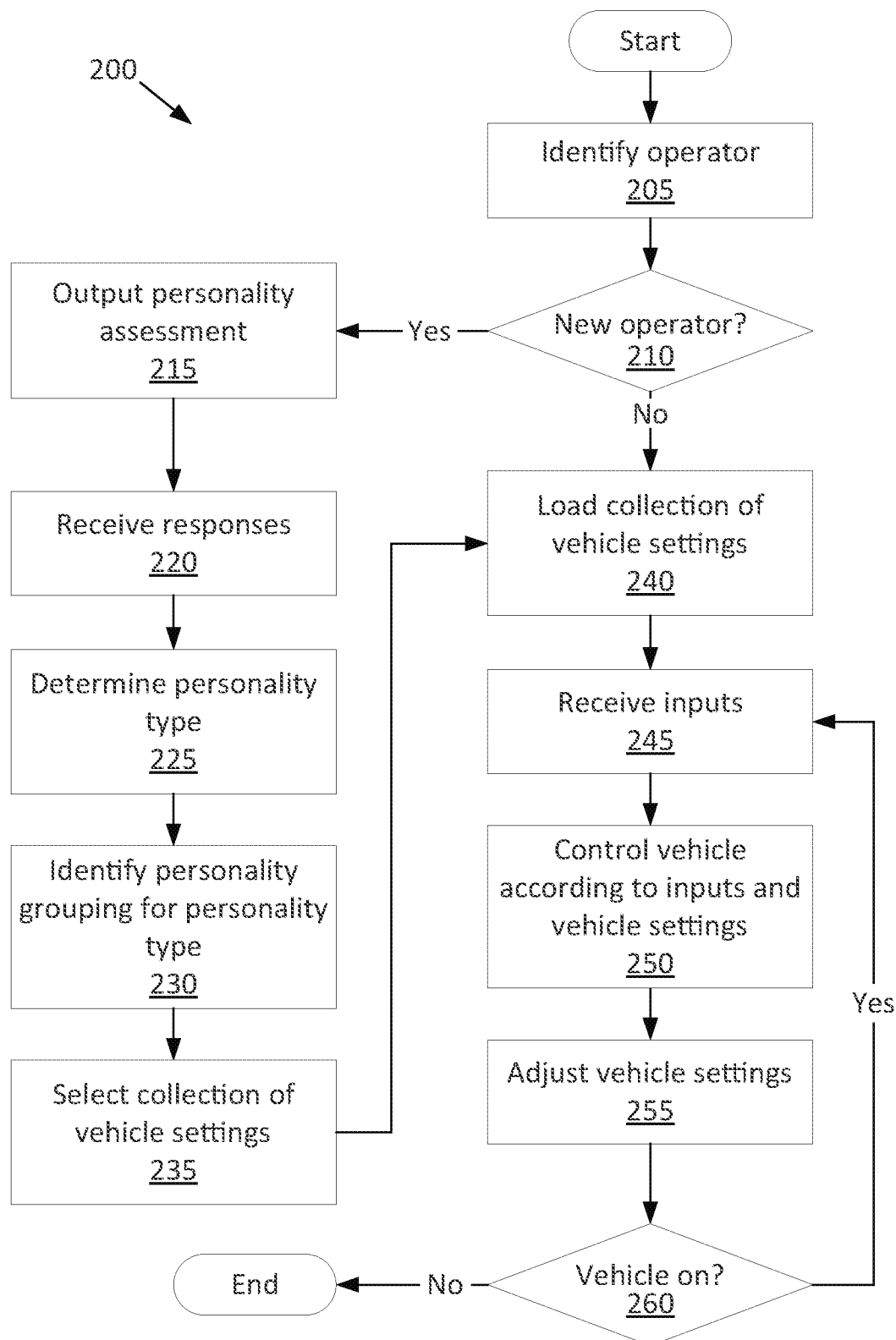
FIG. 2 is a flowchart of an example process for controlling the vehicle based on an assessment of an operator of the vehicle.

FIG. 2 is a process flow diagram illustrating an example process 200 for controlling the vehicle 100 based on the preference grouping of the operator. The memory of the computer 105 stores executable instructions for performing the steps of the process 200 and/or programming can be implemented in structures such as mentioned above. As a general overview of the process 200, the computer 105 may identify the operator. If the operator does not have a preference grouping stored in the operator's profile, the computer 105 outputs the operator assessment questionnaire, receives the operator input in response to the operator assessment questionnaire, determines the personality type of the operator, determines the preference grouping of the operator, and selects the collection of the vehicle settings to store in the profile. Next, or if the operator does have a preference grouping stored in the operator's profile, the computer 105 loads the selected collection of the vehicle settings from the profile, receives inputs, actuates the components of the vehicle 100 in accordance with the selected collection of the vehicle settings and any adjustments, and adjusts the vehicle settings based on the inputs. The process 200 continues for as long as the vehicle 100 is on.

The process 200 begins in a block 205, in which the computer 105 identifies the operator, as described above.

Next in a decision block 210, the computer 105 determines whether the profile of the identified operator includes a collection of the vehicle settings. In response to the profile lacking the collection of the vehicle settings or in response to the operator not yet having a profile, the process 200 continues to a block 215. In response to the profile including the collection of the vehicle settings, the process 200 continues to a block 240.

In the block 215, the computer 105 outputs the operator assessment questionnaire to the operator, as described above.

Next, in a block 220, the computer 105 receives the operator input from the operator in response to the operator assessment questionnaire, as described above.

Next, in a block 225, the computer 105 determines the personality type of the operator based on the operator input, as described above.

Next, in a block 230, the computer 105 identifies the preference grouping for the operator, as described above.

Next, in a block 235, the computer 105 selects a collection of vehicle settings based on the preference grouping, as described above, and stores the collection of the vehicle settings in the profile of the operator. After the block 235, the process 200 proceeds to the block 240.

In the block 240, the computer 105 loads the collection of the vehicle settings from the profile of the operator, i.e., treats the collection of the vehicle settings as the selected collection for the rest of the process 200.

Next, in a block 245, the computer 105 receives inputs from the operator, e.g., commands for the vehicle components or feedback about the vehicle settings, as described above. The computer 105 may prompt the operator to provide the inputs, e.g., by outputting a request for a command or feedback in response to some condition.

Next, in a block 250, the computer 105 actuates the vehicle components in accordance with the selected collection of the vehicle settings and any adjustments to the vehicle settings, which are specific to the identified operator as described above.

Next, in a block 255, the computer 105 adjusts the vehicle settings in the collection based on the input from the block 245, as described above.

Next, in a decision block 260, the computer 105 determines whether the vehicle 100 is still on. If the vehicle 100 is still on, the process 200 returns to the block 245 to continue receiving the inputs and actuating the vehicle components. If the vehicle 100 has been turned off, the process 200 ends.

In general, the computing systems and/or devices described may employ any of a number of computer operating systems, including, but by no means limited to, versions and/or varieties of the Ford Sync® application, App-Link/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary. Use of "in response to," "upon determining," "upon receiving," etc. indicates a causal relationship, not merely a temporal relationship.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A computer comprising a processor and a memory, the memory storing instructions executable by the processor to:

receive operator input from an operator in response to an operator assessment questionnaire including a plurality of questions, the operator input including a plurality of answers to the questions of the operator assessment questionnaire, the operator assessment questionnaire being a standardized personality typology test;

identify a preference grouping for the operator based on the operator input, the preference grouping being a cluster of a plurality of different personality types defined according to the standardized personality typology test; and actuate at least one vehicle component based on the preference grouping.

2. The computer of claim 1, wherein the instructions further include instructions to determine an identified personality type of the operator based on the operator input.

3. The computer of claim 2, wherein the instructions further include instructions to identify the preference grouping based on the identified personality type.

4. The computer of claim 3, wherein the preference grouping is an identified preference grouping, the instructions to identify the identified preference grouping include instructions to execute a machine-learning program, and the machine-learning program is trained to cluster the different personality types into preference groupings including the identified preference grouping.

5. The computer of claim 2, wherein the instructions to determine the identified personality type include instructions to determine a plurality of scores along a respective plurality of dimensions of the different personality types.

6. The computer of claim 1, wherein the instructions further include instructions to identify the operator, and associate the preference grouping with the operator in a profile of the operator.

7. The computer of claim 1, wherein the instructions further include instructions to select a collection of vehicle settings based on the preference grouping, and actuate the at least one vehicle component in accordance with the collection of the vehicle settings.

8. The computer of claim 7, wherein the instructions further include instructions to:

receive a command from the operator to the at least one vehicle component;

adjust at least one of the vehicle settings in the collection based on the command; and store the adjustment of the at least one of the vehicle settings in a profile of the operator.

9. The computer of claim 8, wherein the instructions further include instructions to, during a vehicle trip after a vehicle trip in which the adjustment occurred, actuate the at least one vehicle component in accordance with the adjustment of the at least one of the vehicle settings.

10. The computer of claim 8, wherein the instructions further include instructions to store an adjustment time of day with the adjustment, and, during a vehicle trip after a vehicle trip in which the adjustment occurred, in response to a current time of day being within a same time window as the adjustment time of day, actuate the at least one vehicle component in accordance with the adjustment of the at least one of the vehicle settings.

11. The computer of claim 8, wherein a direction of the adjustment is based on whether a characteristic of the command is above or below a threshold.

12. The computer of claim 7, wherein the preference grouping is an identified preference grouping, the collection of the vehicle settings is a selected collection, the memory stores a plurality of preference groupings including the identified preference grouping and a plurality of collections of the vehicle settings including the selected collection, and the memory stores a mapping of the preference groupings to the collections.

13. The computer of claim 7, wherein the vehicle settings include a density of content on a display screen.

14. The computer of claim 7, wherein the vehicle settings include a frequency of outputting audible statements.

15. The computer of claim 7, wherein the vehicle settings include a climate-control setting.

16. The computer of claim 7, wherein the vehicle settings include a frequency of executing a vehicle feature received from a remote server.

17. The computer of claim 7, wherein the vehicle settings include an interior lighting setting.

18. The computer of claim 1, wherein the preference grouping is an identified preference grouping, the instructions to identify the identified preference grouping include instructions to identify the identified preference grouping from a plurality of stored preference groupings stored in the memory of the computer.

19. A method comprising:

receiving operator input from an operator in response to an operator assessment questionnaire including a plurality of questions, the operator input including a plurality of answers to the questions of the operator assessment questionnaire, the operator assessment questionnaire being a standardized personality typology test;

identifying a preference grouping for the operator based on the operator input, the preference grouping being a cluster of a plurality of different personality types defined according to the standardized personality typology test; and actuating at least one vehicle component based on the preference grouping.

* * * * *